(12) United States Patent  
Dallenbach et al.

(10) Patent No.: US 7,921,728 B2  
(45) Date of Patent: Apr. 12, 2011

(54) FLEXIBLE APPARATUS AND METHOD TO ENHANCE CAPACITIVE FORCE SENSING

(75) Inventors: William D. Dallenbach, Sunnyvale, CA (US); Divyasimha Harish, Fremont, CA (US)

(73) Assignee: YPoint Capital, Inc, Fremont, CA (US)

( * ) Notice: Subject to any disclaimer, the term of this patent is extended or adjusted under 35 U.S.C. 154(b) by 0 days.

(21) Appl. No.: 12/032,718

(22) Filed: Feb. 18, 2008

(65) Prior Publication Data

US 2009/0205437 A1    Aug. 20, 2009

Related U.S. Application Data

(63) Continuation-in-part of application No. 11/305,673, filed on Dec. 16, 2005, now Pat. No. 7,353,713, and a continuation-in-part of application No. 11/237,353, filed on Sep. 28, 2005, now Pat. No. 7,187,185, and a continuation-in-part of application No. 11/237,060, filed on Sep. 28, 2005, now Pat. No. 7,451,659, and a continuation-in-part of application No. 10/823,518, filed on Apr. 9, 2004, now Pat. No. 7,047,818.

(60) Provisional application No. 60/461,528, filed on Apr. 9, 2003.

(51) Int. Cl.  
*G01B 7/16* (2006.01)

(52) U.S. Cl. .............. 73/780; 73/862.337; 73/862.626

(58) Field of Classification Search .............. 73/780, 73/862.337, 862.626  
See application file for complete search history.

(56) References Cited

U.S. PATENT DOCUMENTS

| | | | | |
|---|---|---|---|---|
| 3,841,153 A * | 10/1974 | Michelson | ...... | 73/161 |
| 4,466,046 A * | 8/1984 | Cherry | ...... | 361/288 |
| 4,951,764 A * | 8/1990 | Brand | ...... | 177/210 C |
| 5,169,112 A * | 12/1992 | Boyles et al. | ...... | 248/550 |
| 6,026,694 A * | 2/2000 | Gray | ...... | 73/862.68 |
| 6,079,282 A * | 6/2000 | Lanter | ...... | 73/862.626 |
| 6,196,067 B1 * | 3/2001 | Martin et al. | ...... | 73/514.32 |
| 6,642,857 B1 * | 11/2003 | Schediwy et al. | ...... | 341/20 |
| 6,802,222 B2 * | 10/2004 | Ishio et al. | ...... | 73/718 |
| 7,047,818 B2 * | 5/2006 | Dallenbach et al. | ...... | 73/780 |
| 7,353,713 B2 * | 4/2008 | Harish et al. | ...... | 73/780 |

* cited by examiner

*Primary Examiner* — Max Noori  
(74) *Attorney, Agent, or Firm* — Raj Abhyanker, P.C.

(57) ABSTRACT

A flexible apparatus and method to enhance capacitive force sensing is disclosed. In one embodiment, a force measuring device includes a sensor capacitor having a fixed surface and a moveable surface substantially parallel to the fixed surface, at least one spring assembly (e.g., may deflect longitudinally and/or perpendicularly to a direction of the force) positioned between the fixed surface and the movable surface (e.g., the spring assembly may alter in height in response to a force applied perpendicular to the movable surface and to cause a change in the gap between the fixed surface and the movable surface), and a circuit to generate a measurement of the force based on an algorithm that considers a change in a capacitance of the sensor capacitor. A reference capacitor may adjust the measurement of the applied force based on one or more environmental conditions.

13 Claims, 14 Drawing Sheets

FLEXIBLE APPARATUS AND METHOD TO ENHANCE CAPACITIVE FORCE SENSING

CLAIM OF PRIORITY

This application is a continuation-in-part and claims priority from:
1. U.S. Provisional Application No. 60/461,528 filed on Apr. 9, 2003,
2. U.S. Non-Provisional application Ser. No. 10/823,518 filed on Apr. 9, 2004 now U.S. Pat. No. 7,047,818,
3. U.S. Non-Provisional application Ser. No. 11/237,060 filed on Sep. 28, 2005 now U.S. Pat. No. 7,451,659,
4. U.S. Non-Provisional application Ser. No. 11/237,353 filed on Sep. 28, 2005 now U.S. Pat. No. 7,187,185,
5. U.S. Continuation-in-Part application Ser. No. 11/305,673 filed on Dec. 16, 2005 now U.S. Pat No. 7,353,713

FIELD OF TECHNOLOGY

This disclosure relates generally to the technical fields of measuring devices and, in one embodiment, to gap-change sensing through capacitive techniques.

BACKGROUND

A load cell may be a device (e.g., a transducer) that converts a force to a differential signal (e.g., a differential electric signal). The load cell may be used for a variety of industrial applications (e.g., a scale, a truck weigh station, a tension measuring system, a force measurement system, a load measurement system, etc.) The load cell may be created using a strain gauge. The strain gauge can be used to measure deformation (e.g., strain) of an object. The strain gauge may include a flexible backing which supports a metallic foil pattern etched onto the flexible backing. As the object is deformed, the metallic foil pattern is deformed, causing its electrical resistance to change.

The strain gauge can be connected with other strain gauges to form a load cell in a Wheatstone-bridge configuration (e.g., constructed from four strain gauges, one of which has an unknown value, one of which is variable, and two of which are fixed and equal, connected as the sides of a square). When an input voltage is applied to the load cell in the Wheatstone-bridge configuration, an output may become a voltage proportional to the force on the load cell. The output may require amplification (e.g., 125×) by an amplifier before it can be read by a user (e.g., because the raw output of the Wheatstone-bridge configuration may only be a few milli-volts). In addition, the load cell in the Wheatstone-bridge configuration may consume a significant amount of power when in operation (e.g., in milli-watts of power).

Manufacturing the load cell in the Wheatstone-bridge configuration may involve a series of operations (e.g., precision machining, attaching strain gauges, match strain gauges, environmental protection techniques, and/or temperature compensation in signal conditioning circuitry, etc.). These operations may add complexity that may deliver a yield rate of only 60%, and may allow a particular design of the load cell to only operate for a limited range (e.g., between 10-5,000 lbs.) of measurement. In addition, constraints of the Wheatstone-bridge configuration may permit only a limited number of form factors (e.g., an s-type form factor and/or a single point form factor, etc.) to achieve desired properties of the load cell. The complexity of various operations to manufacture and use load cell may drive costs up (e.g., hundreds and thousands of dollars) for many industrial applications.

Conventional capacitive force sensing devices suffer from several constraints of the springs which are used in such devices. Some of these constraints are relaxation and/or creep, hysteresis, set, and off-axis loading. Particularly, hysteresis is a limitation inherent to the use of various springs (e.g., lagging of an effect behind its cause). When there is a difference in spring deflection at the same applied load-during loading and/or unloading the spring may have hysteresis. Hysteresis could result from set, creep, relaxation and/or friction. Hysteresis may limit the usefulness of a capacitive force sensing device. Specifically, the spring may consistently and repeatedly return to its original position as the load is applied and/or removed. Failure to do so may cause erroneous readings.

An off-axis loading may occur when the direction of an applied load is not along a normal axis of a sensor. The off-axis loading can cause the surfaces to become non-parallel and/or can significantly impact various measurements. Many traditional springs such as helical springs or elastomeric springs made from polymers, (e.g., rubber or plastic) may suffer from many of the above constraints and consequently may not be suitable for high precision applications.

SUMMARY

A flexible apparatus and method to enhance capacitive force sensing is disclosed. In one aspect, a force measuring device includes a sensor capacitor having a fixed surface and a movable surface substantially parallel to the fixed surface, at least one spring assembly positioned between the fixed surface and the movable surface (e.g., may alter in height in response to a force applied perpendicular to the movable surface and to cause a change in a gap between the fixed surface and the movable surface), and a circuit to generate a measurement of the force based on an algorithm that considers a change in a capacitance of the sensor capacitor.

The force measuring device may include a reference capacitor to adjust the measurement based on one or more environmental conditions. A shielding spacer may be placed between the reference capacitor and a bottom layer to minimize an effect of a stray capacitance affecting the measurement. One or more spring assemblies may deflect longitudinally and/or perpendicularly to a direction of the force such that a perpendicular deflection does not contact the movable surface and the fixed surface.

The spring assemblies may be formed by a conical washer having an inside edge of the conical washer that is wider than an outside edge of the conical washer. The conical washer may be stacked with other conical washers to form the at least one spring assembly. The fixed surface and/or the movable surface may be painted on any number of non-conductive printed circuit boards.

In another aspect, a force measuring device includes a sensor capacitor having a fixed surface and a movable surface substantially parallel to the fixed surface, a fixed layer perpendicular to the movable surface, at least one spring assembly positioned between the movable surface and/or the fixed layer to alter in height in response to a force applied parallel to the movable surface (e.g., and to cause a change in an overlap area between the fixed surface and the movable surface), and a circuit to determine a measurement based on an algorithm that considers a change in capacitance when the overlap area changes. A reference capacitor may be integrated in the force measuring device to adjust based on one or more environmental conditions between the fixed surface and another fixed surface.

In yet another aspect, a method to measure force includes positioning at least one spring assembly between a fixed surface and a movable surface, applying a force (e.g., a load, a stress, etc.) perpendicular to the movable surface to cause a change in the height of the at least one spring assembly and to cause a change in a gap between the fixed surface and the movable surface, and automatically generating a measurement of a force based on an algorithm that considers a change in a capacitance between the fixed surface and the movable surface. The measurement of the force may be adjusted based on a change in a reference capacitance that is affected primarily because of one or more environmental conditions.

In a further aspect, a system (e.g., and/or method) to measure force may include positioning an elastic device between a movable surface and a fixed surface perpendicular to the movable surface, causing the elastic device to change form based on a force applied adjacent to the movable surface, and automatically generating a measurement of the force based on a change in an overlap area between a fixed surface and the movable surface. In addition the system may include forming the reference capacitor by substantially parallel plates of the fixed surface and a reference surface, and adjusting the measurement based on a change in capacitance of a reference capacitor whose capacitance changes primarily because of one or more environmental conditions. The methods, systems, and apparatuses disclosed herein may be implemented in any means for achieving various aspects, and may be executed in a form of a machine readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Figure 1:
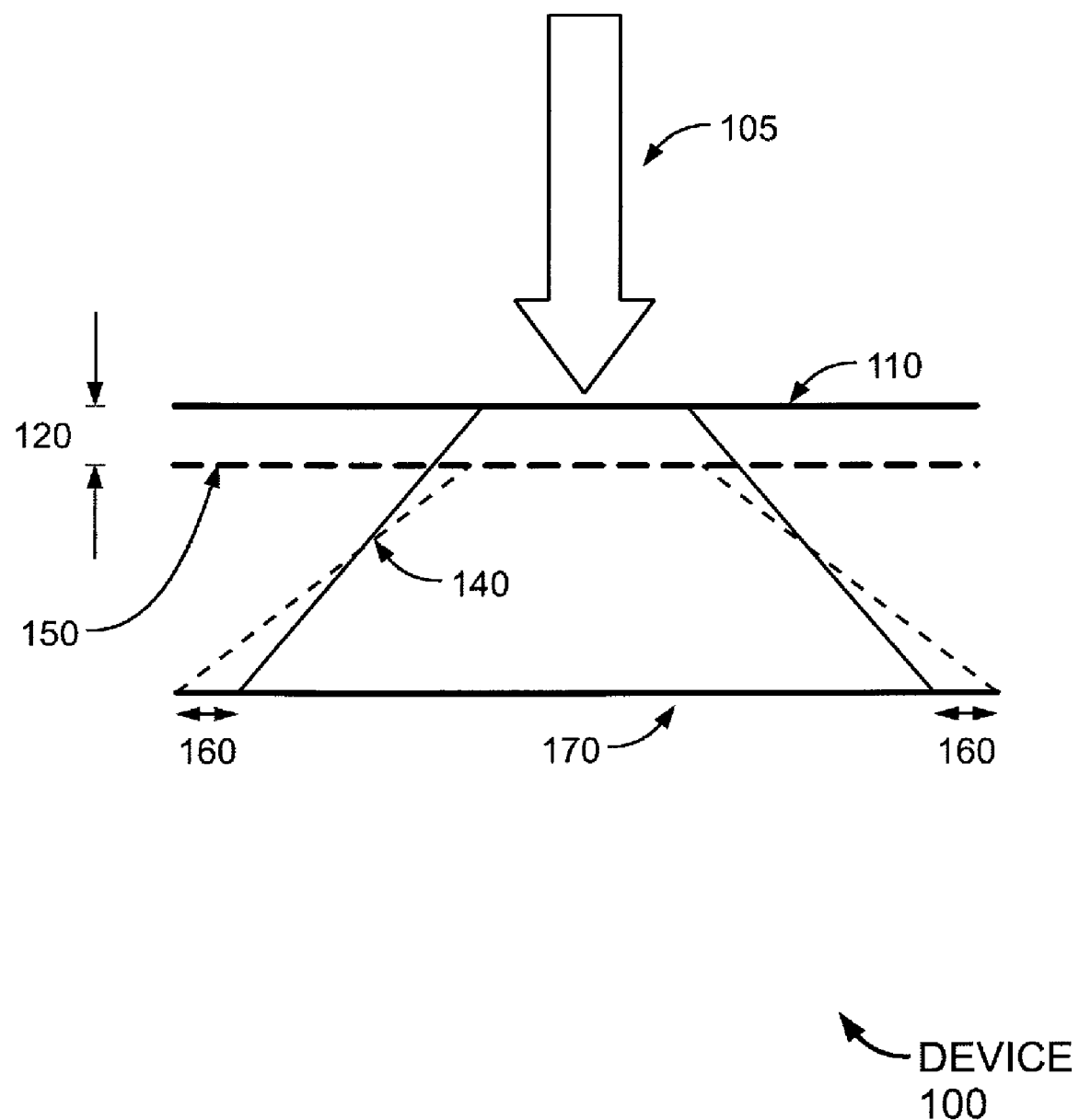
FIG. 1 is a cross-sectional view of a metal conical washer positioned between a fixed surface and a movable surface and exhibiting a deflection in response to an applied force, according to one embodiment.

Other features of the present embodiments will be apparent from the accompanying drawings and from the detailed description that follows.

DETAILED DESCRIPTION

Example embodiments, as described below, may be used to provide high-accuracy, low-cost, force sensing devices (e.g., load sensors, pressure sensors, etc.). It will be appreciated that the various embodiments discussed herein may/may not be the same embodiment, and may be grouped into various other embodiments not explicitly disclosed herein. In the following description, for purposes of explanation, numerous specific details are set forth in order to provide a thorough understanding of the various embodiments. It will be evident, however, to one skilled in the art that the various embodiments may be practiced without these specific details.

A spring assembly which overcomes the problems of relaxation, creep, hysteresis, set, and/or off-axis loading is disclosed in one embodiment. The spring assembly in its various embodiments has the property that when a force is applied to the spring assembly, the spring assembly deflects both longitudinally (e.g., along a direction of an applied force) and perpendicularly to a direction of the applied force. However, at the points where the spring assembly contacts other surfaces and/or layers, a perpendicular deflection is negligible which reduces the problem of friction and, therefore, hysteresis.

The various embodiments of the spring assembly may be used in different types of force measuring devices (e.g., a gap-change sensing device, an area-change sensing device, etc.). The spring assembly may include a conical metal washer. The metal conical washer may provide several substantial advantages. The metal conical washer may have a large base (e.g., 3×) compared to its height combined with a large flat top surface which makes it unlikely that the applied force will cause the movable surface to suffer off-axis loading thus becoming non-parallel. Further, metals may be less susceptible to set and creep than other materials.

In another embodiment of the spring assembly, the spring assembly may include two conical washers placed back to back in such a way that the top and/or bottom surfaces are wide, but not as wide as the middle. In another embodiment, the spring assembly may include multiple pairs of conical washers placed back to back. In yet another embodiment of the spring assembly, the spring assembly includes multiple sets of conical metal washers placed base to base, each set including at least one conical metal washer.

The various embodiments of the spring assembly may be used in different types of force measuring devices (e.g., a gap-change sensing device, an area-change sensing device, etc.). In a gap-change sensing device, the spring assembly can be positioned between a fixed surface and a movable surface which is substantially parallel to the fixed surface. When a force is applied perpendicular to the movable surface, the height of the spring assembly may be changed and this may cause change in the gap between the fixed surface and the movable surface. The change in the gap between the fixed surface and the movable surface may cause a change in the capacitance between the fixed surface and the movable surface, which can algorithmically be measured as a force.

In an area-change sensing device, a sensor capacitor may have a fixed surface and a movable surface substantially parallel to the fixed surface, a fixed layer perpendicular to the fixed surface, and at least one spring assembly positioned between the movable surface and the fixed layer to alter in height in response to a force applied adjacent to the movable surface, and to cause a change in an overlap area between the fixed surface and the movable surface, and a circuit to determine a measurement based on an algorithm that considers a change in capacitance when the overlap area changes.

A spring assembly as disclosed in the various embodiments herein can overcome the problems of relaxation, creep, hysteresis, set, and/or off-axis loading which are prevalent in conventional springs used in different force measuring devices through the use of flexible devices having elastic qualities (e.g., spring assemblies, devices 100, 200, 300, 400 of FIGS. 1-4, etc.). The spring assemblies in their various embodiments may have the property that when a force is applied to the spring assembly, the spring assembly may deflect both longitudinally (along the direction of the applied force) and perpendicularly to the direction of the applied force. However, at the points where the spring assembly contacts other surfaces and/or layers, the perpendicular deflection may be negligible which reduces the problem of friction and, therefore, hysteresis.

A few embodiments of spring assembly have been shown in FIGS. 1-4 by way of illustration. The various embodiments of the spring assembly may be used in different types of force measuring devices (including, e.g., a gap-change sensing device, an area-change sensing device, etc.).

FIG. 1 is a cross-sectional view of a device 100, with a conical washer 140 positioned between a fixed surface 170 and a movable surface 110, and exhibiting a deflection in response to an applied force 105, according to one embodiment. The conical washer 140 may have an inside edge that is wider than an outside edge, and may be made of metal (e.g., metals may be less susceptible to set and creep than other materials). In alternate embodiments, the conical washer 140 may be created from a synthetic material (e.g., a polymer based material). The conical washer 140 may deflect both longitudinally 120 (along the axis) and perpendicularly 160 (perpendicular to the axis) to the direction of unknown force 105. When the force 105 is applied to the conical metal washer 140, the movable surface 110 shifts to the position 150.

At the points where the conical metal washer is in contact with other surfaces and/or layers (e.g., the movable surface 110), a perpendicular deflection (e.g., perpendicular to the direction of the force 105) may be negligible. This may reduce friction and, therefore, hysteresis. The fixed surface 170 and the movable surface 110 may be painted (e.g., sputtered, coated) on multiple non-conductive printed circuit boards (e.g., the printed circuit boards 502, 506, 510 of FIG. 5). The conical metal washer 140 may have a large base compared to its height. In addition, a large flat top surface may make it unlikely that the applied force will cause off-axis loading.

Figure 2:
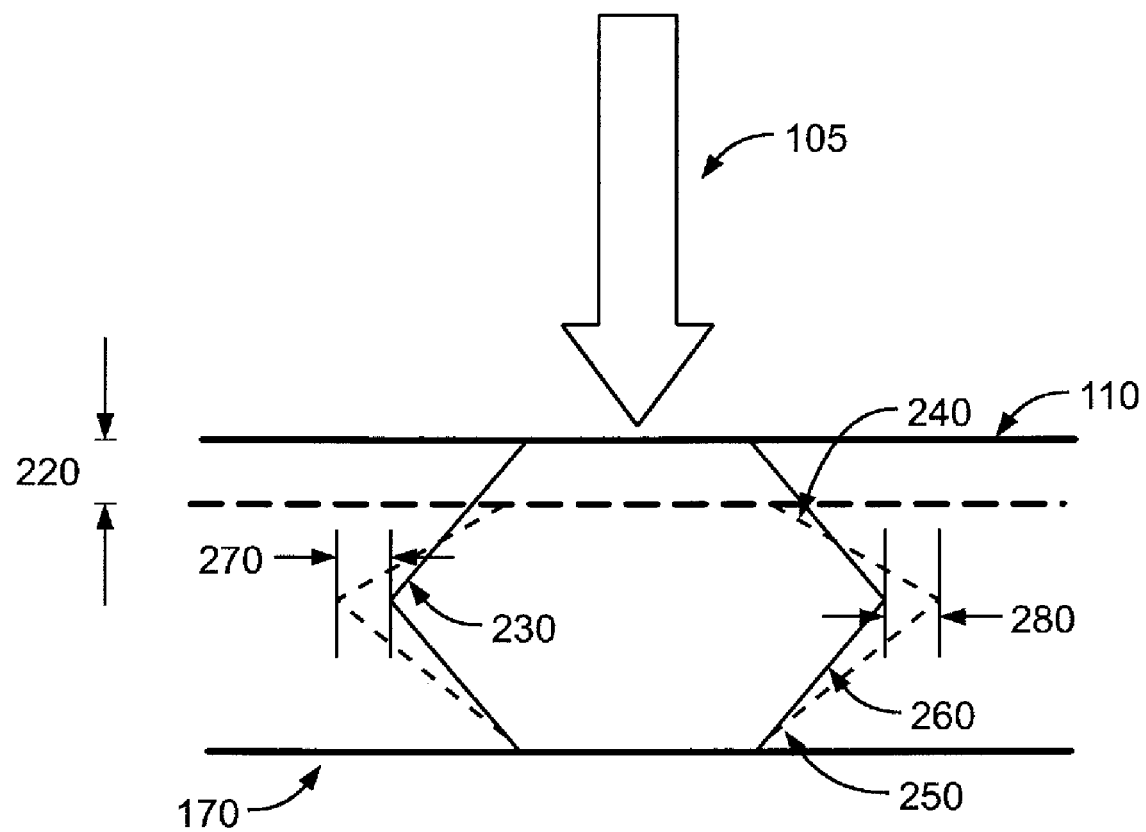
FIG. 2 is a cross-sectional view of two metal conical washers positioned back to back between the fixed surface and the movable surface of FIG. 1, according to one embodiment.

FIG. 2 is a cross-sectional view of a device 200, with two metal conical washers positioned back to back between the fixed surface 170 and the movable surface 110, according to one embodiment. A first conical washer 230 and a second conical washer 260 may be placed back to back in such a way that the top and bottom surfaces are wide, but not as wide as the middle. As a force 105 is applied against the movable surface 110, it may cause a longitudinal deflection 220 in the device 200, and perpendicular deflections 270 and 280 in the conical washers 230 and 260. However, at the points where the conical washer 230 contacts the movable surface 110 and where the conical washer 260 contacts the fixed surface 170, perpendicular deflections 240 and 250 are negligible, which may reduce the problem of friction and therefore, hysteresis. The conical washers 230 and 260 may be bonded together using an adhesive and/or glue in one embodiment. In alternate embodiments, the conical washers 230 and 260 may be welded together.

Figure 3:
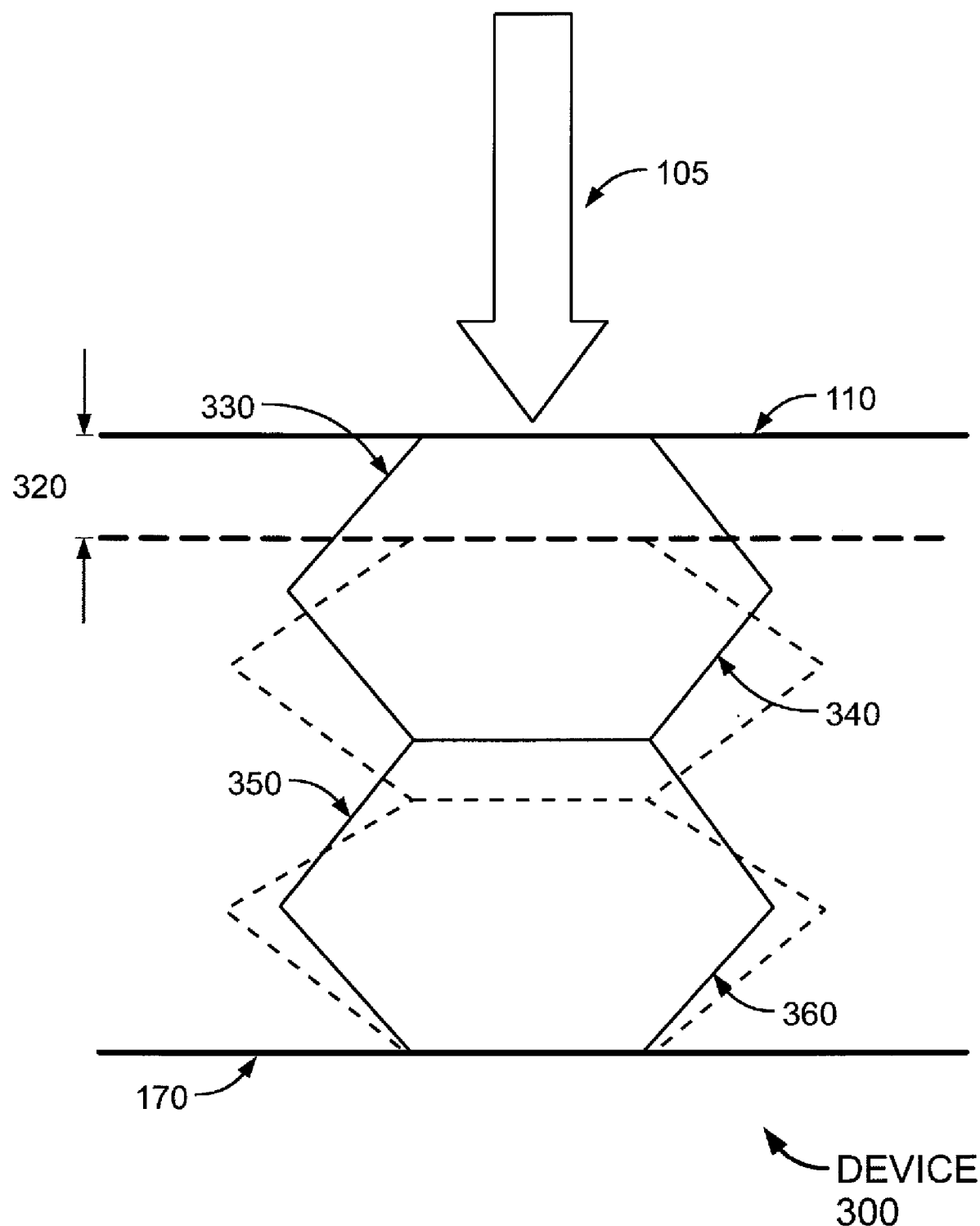
FIG. 3 is a cross-sectional view of multiple metal conical washers positioned back to back between the fixed surface and the movable surface, according to one embodiment.

FIG. 3 is a cross-sectional view of a device 300, with multiple metal conical washers positioned back to back between the fixed surface 170 and the movable surface 110, according to one embodiment. As the force 105, also shown in FIG. 1, is applied against the movable surface 110, it causes longitudinal deflection 320 in the spring assembly, and perpendicular deflections in conical washers 330, 340, 350, and 360. However, at the points where the conical washer 330 contacts the movable surface 110, where the conical washer 360 contacts the fixed surface 170, and also where the conical washer 340 contacts conical washer 350, perpendicular deflections may be negligible.

Figure 4:
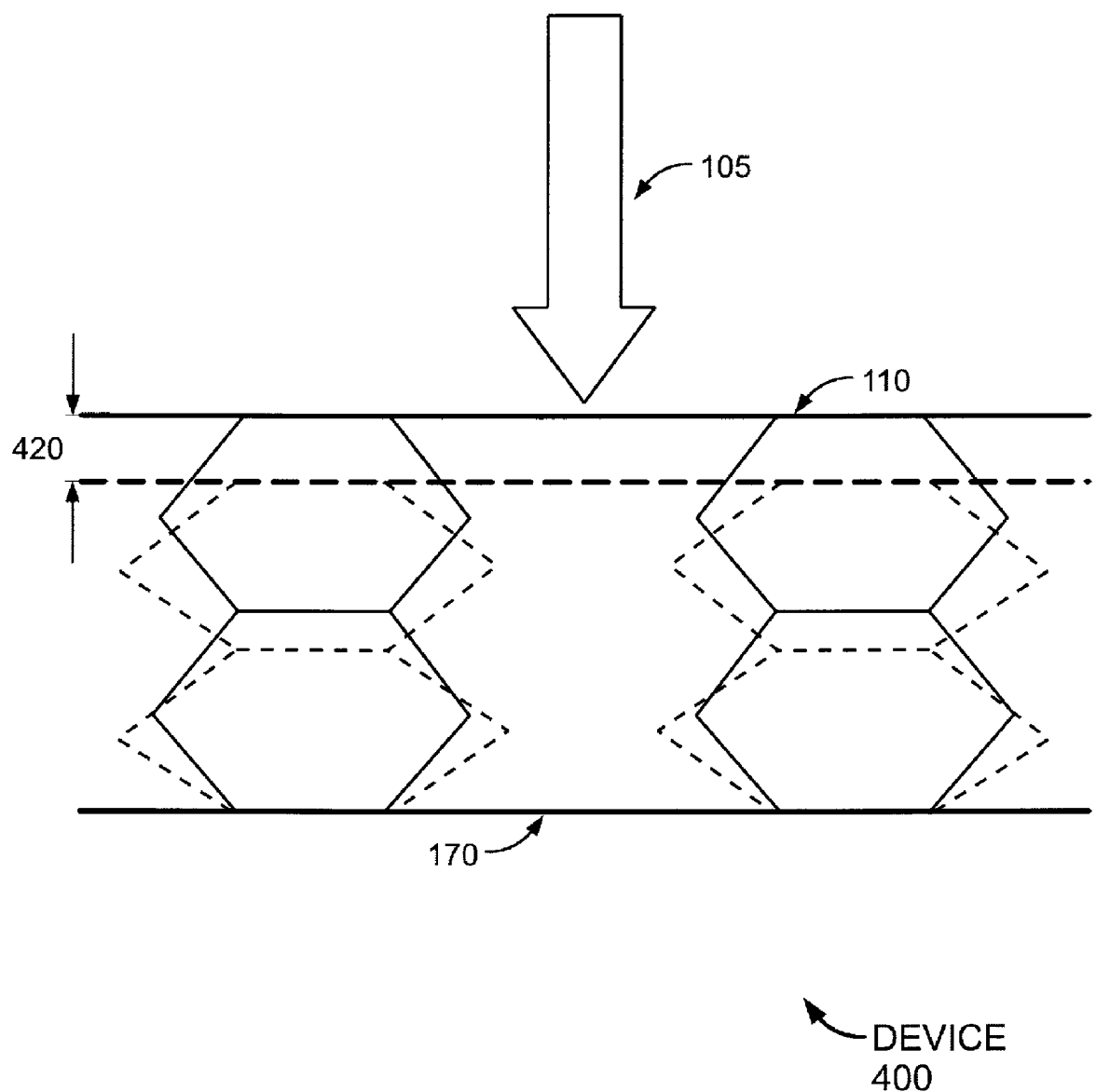
FIG. 4 is a cross-sectional view of multiple sets of multiple metal conical washers positioned back to back between the fixed surface and the movable surface, according to one embodiment.

FIG. 4 is a cross-sectional view of a device 400, with multiple sets of multiple metal conical washers positioned back to back between the fixed surface and the movable surface, according to one embodiment. FIG. 4 illustrates a device 400 in which multiple sets (e.g., one set may have two washers) of conical washers are placed base to base (e.g., back to back), each set including at least one conical metal washer. As the force 105, also shown in FIG. 1, is applied against the movable surface 110, it may cause longitudinal deflection 420 in the device 400, and perpendicular deflections in all the conical washers, similar to the perpendicular deflections shown in FIGS. 2 and 3. The device 300 of FIG. 3 and the device 400 of FIG. 4 illustrate different configurations of the device 200 of FIG. 2 that may be employed to provide further advantages in various applications (e.g., higher load measurement capacity, lesser likelihood of off-axis loading).

In a gap-change sensing device, a spring assembly (e.g., the assembly of conical washers 330, 340, 350, and 360 of FIG. 3) may be positioned between a fixed surface (e.g., the fixed surface 170 of FIG. 1) and a movable surface (e.g., the movable surface 110 of FIG. 1) that is substantially parallel to the fixed surface. When a force is applied perpendicular to the movable surface, it causes change in the gap between the fixed surface and the movable surface. The change in the gap between the fixed surface and the movable surface may cause a change in the capacitance between the fixed surface and the movable surface. A gap-change sensing device may generate a measurement based on the change in capacitance of a sensor capacitor resulting from a change in a gap between a fixed surface and a movable surface. A reference capacitor may be used to adjust the measurement based on at least one environmental condition.

Figure 5:
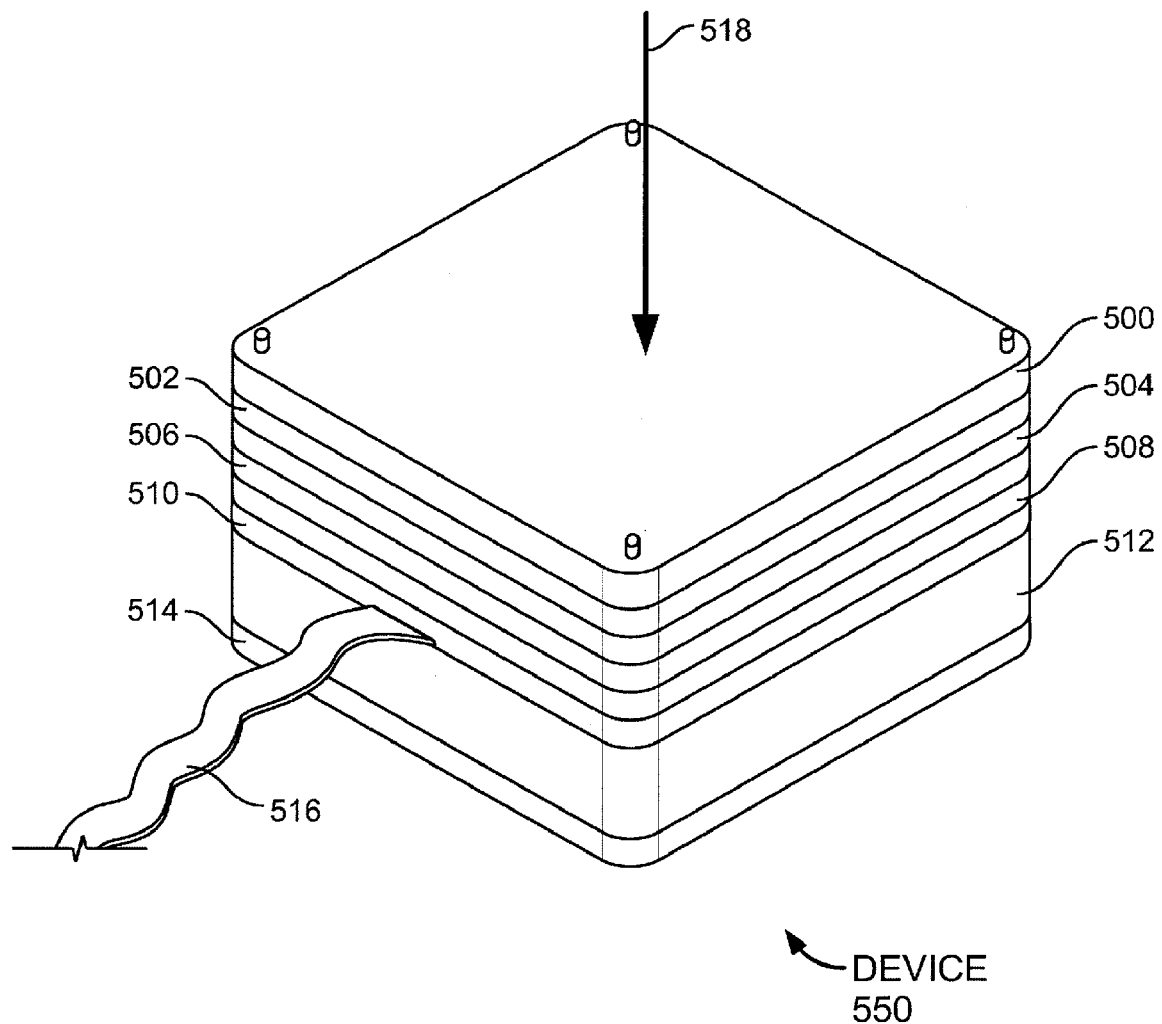
FIG. 5 is a three-dimensional view of a stacked gap-change sensing device having a sensor capacitor and a reference capacitor, according to one embodiment.

FIG. 5 is a three-dimensional view of a stacked device 550 having a sensor capacitor (e.g. formed by the fixed surface 170 and the movable surface 110 of FIG. 1) and a reference capacitor (e.g., formed by the surface 622 of FIG. 6C and the surface 628 of FIG. 6E), according to one embodiment. The stacked device 550 of FIG. 5 includes a top layer 500, a printed circuit board 502, a device 504 (e.g., the devices 100, 200, 300, 400), a printed circuit board 506, a spacer 508, a printed circuit board 510, a shielding spacer 512, and a bottom layer 514. A cable 516 (e.g., an interface cable) may connect the stacked device 550 to a data processing system. In addition, a force 518 (e.g., a load, a weight, a pressure, etc.) may be applied to the top layer 500. The various components of the stacked device 550 are best understood with reference to FIGS. 6A-6G.

Figure 6A:
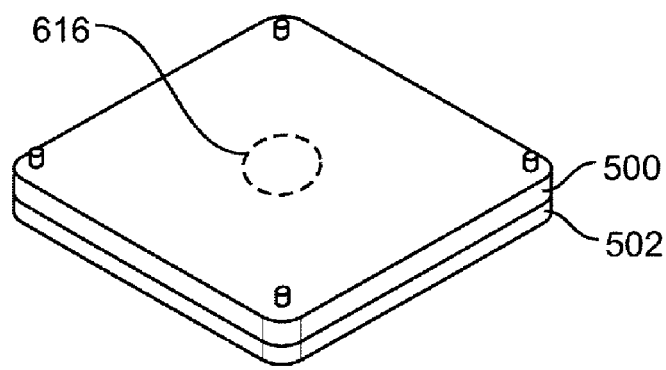
FIGS. 6A-6G are exploded views of the stacked device of FIG. 1, according to one embodiment.
Figure 6B:
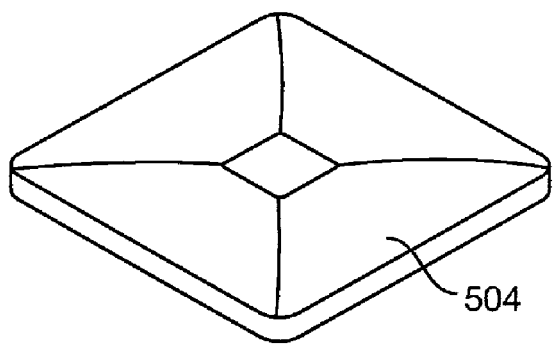

FIGS. 6A-6G are exploded views of the stacked device 550 of FIG. 5. FIG. 6A illustrates the top layer 500 and the printed circuit board 502. The top layer 500 may be created from a material such as aluminum, steel, and/or a plastic, etc. The printed circuit board 502 includes a surface 616. The surface 616 may be painted (e.g., sputtered, coated, etc.) on the printed circuit board 502. The printed circuit board 502 may be coupled (e.g., screwed onto, bonded, etched, glued, affixed, etc.) to the top layer 500 as illustrated in FIG. 6A so that when the force 518 (e.g., as illustrated in FIG. 5) is applied to the top layer 500, the height of the spring assembly 504 (e.g., as illustrated in FIG. 5) is reduced, resulting in change in the gap between the surface 616 and a surface 620 separated by the spring assembly 504 as illustrated in FIG. 6B.

Figure 6C:
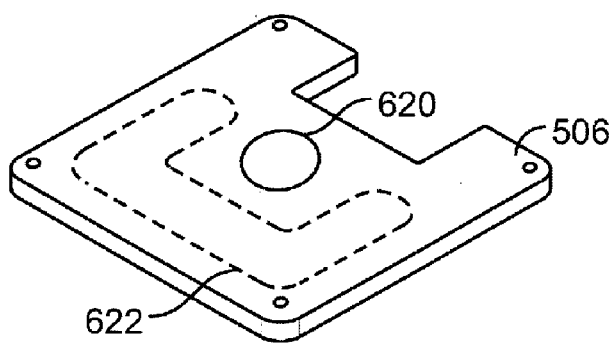

FIG. 6C is a view of the printed circuit board 506 (e.g., a non-conductive material). In the embodiment illustrated in FIG. 6C, a surface 620 (e.g., a conductive surface) is painted (e.g., coated, sputtered, etc.) on the printed circuit board 506 on one side. In addition, a surface 622 may be painted on the other side of the printed circuit board 506 as illustrated in FIG. 6C. The surface 616 may be painted (e.g., sputtered, coated, etc.) on the printed circuit board 506. The change in the gap between the surface 616 and the surface 620 may cause a change in capacitance of a sensor capacitor (e.g., the sensor capacitor formed by the surface 616 and the surface 620 separated by the spring assembly 504.

In one embodiment, the surface 616 and the surface 620 are substantially parallel to each other and have the same physical area and/or thickness. A change in capacitance of the sensor capacitor may be inversely proportional to the change in the distance between the surface 616 and the surface 620 in one embodiment.

The spring assembly 504 of FIG. 6C may be coated with an insulating material at the ends where it comes in contact with the fixed surface 620 and the movable surface 616 (e.g., to avoid a short circuit). In one embodiment, the spring assembly 504 may be created from a conductive synthetic material rather than solely one or more metals. The spring assembly 504 may create a gap between the surface 616 and the surface 620. The gap can be filled with air or any other gas (e.g., an inert gas).

Figure 6D:
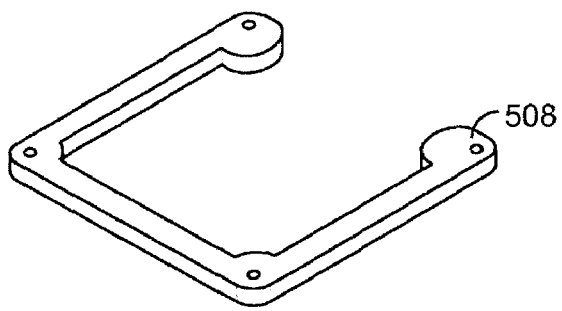
Figure 6E:
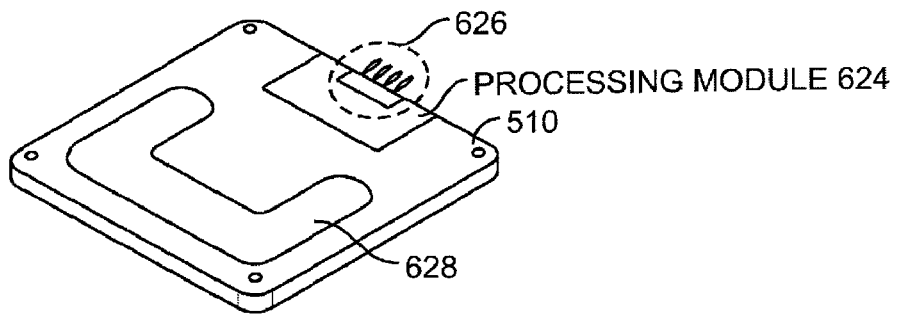

The surface 622 as illustrated in FIG. 6C and the surface 628 as illustrated in FIG. 6E may be separated by the spacer 508 as illustrated in FIG. 6D. The surface 622 and the surface 628 may form a reference capacitor according to one embodiment. Since the surface 622 and the surface 628 may not alter positions with respect to each other when the force 518 is applied to the top layer 500, their capacitance may not change (e.g., capacitance is calculated as "capacitance=(dielectric constant multiplied by area of overlap) divided by (distance between surfaces)") in response to the applied force 518.

As such, the reference capacitor formed by the surface 622 and the surface 628 may experience a change in capacitance only for environmental factors (e.g., humidity in a gap between the first surface and the second surface, a temperature of the stacked device 550, and an air pressure of an environment surrounding the stacked device 550, etc.). Therefore, the effect of these environmental conditions can be removed from a measurement of a change in capacitance of the sensor capacitor (e-g. formed by the surface 616 and the surface 620) when the force 518 is applied to the stacked device 550 to more accurately determine a change in capacitance of the sensor capacitor.

A processing module 624 as illustrated in FIG. 6E of the stacked device 550 may be used to generate a measurement based on a change in a distance between the surface 616 of FIG. 6A and the surface 620 of FIG. 6C (e.g., through coupling the stacked device 550 through a connector 624 of FIG. 6E with the cable 512 of FIG. 5). In addition, the processing module 624 may generate a measurement of the sensor capacitor after removing an effect of the environmental condition from a capacitance of the sensor capacitor (e.g., by subtracting the changes in the reference capacitor, which may be only affected by environmental conditions).

Figure 6F:
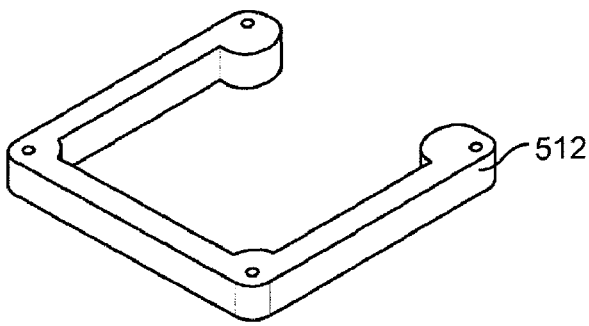
Figure 6G:
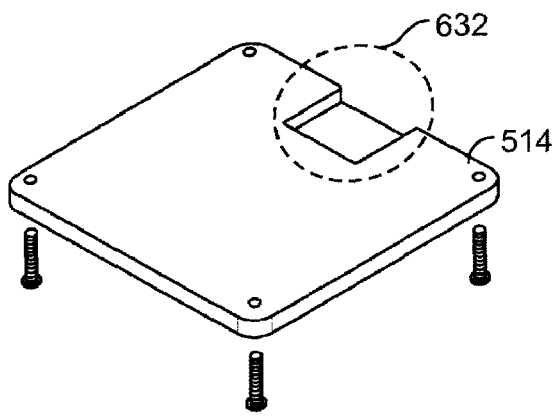

The shielding spacer 512 as illustrated in FIG. 6F may separate the printed circuit board 510 from a bottom layer 514 (e.g., to minimize an effect of a stray capacitance affecting the measurement). The bottom layer 514 is illustrated in FIG. 6G. The various components illustrated in FIGS. 6A-6G may physically connect to each other to form the stacked device 550 in one embodiment (e.g., in alternate embodiments the various components may be screwed together, welded together, bound together, etc.).

The spring assembly 504 of the stacked device 550 of FIG. 5 in different embodiments may include one or more metal conical washers. According to one embodiment, the spring assembly 504 of the stacked device 550 may include one conical washer, as illustrated in FIG. 1. According to another embodiment, the spring assembly 504 of the stacked device 550 may include a pair of conical washers, as illustrated in FIG. 2. According to another embodiment, the spring assembly 504 of the stacked device 550 may include multiple pairs of conical washers stacked on top of each other, as illustrated in FIG. 3. According to yet another embodiment, the spring assembly 504 of the stacked device 550 may include multiple sets of conical washers, each set including at least one conical washer, as illustrated in FIG. 4.

Figure 7:
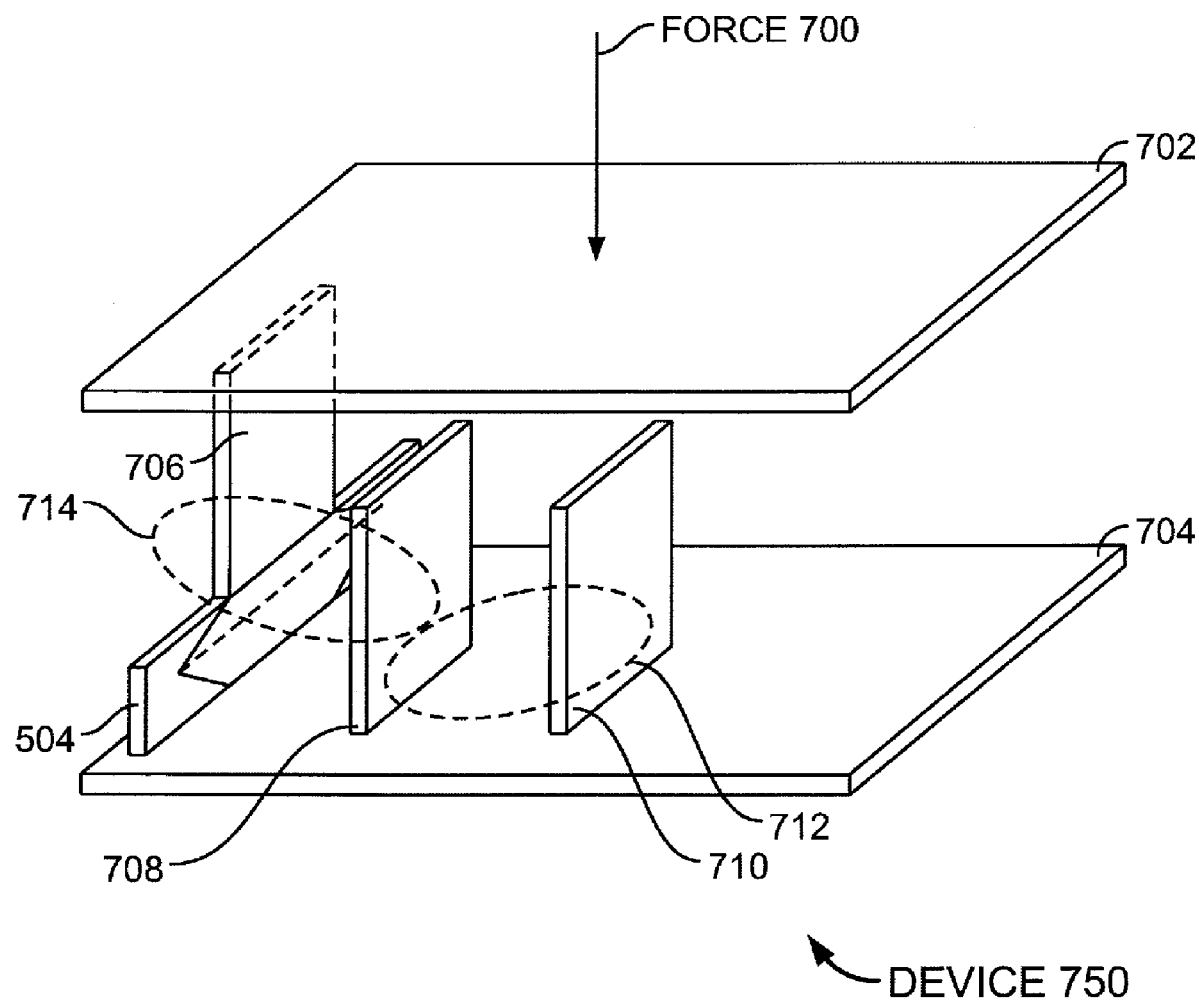
FIG. 7 is an area-sensing device formed by two substantially parallel surfaces and a spring assembly positioned between the movable surface and a fixed layer, according to one embodiment.

FIG. 7 is an area-sensing device 750 formed by two substantially parallel surfaces and a spring assembly positioned between the movable surface and a fixed layer, according to one embodiment. Device 750 includes a top layer 702 (e.g., a conductive and/or non-conductive substrate) and a bottom layer 704 (e.g., a conductive and/or nonconductive substrate), according to one embodiment. A force 700 is applied to the top layer 702 in FIG. 7. The top layer 702 includes a movable surface 706 perpendicular to the top layer 702. The bottom layer 704 includes a surface 708 and a surface 710, both the surfaces perpendicular to the bottom layer 704.

The movable surface 706 is substantially perpendicular to the fixed layer 704, but is not directly in contact with the fixed layer, the device 504 being positioned between the movable surface 706 and the fixed layer 704 (e.g., illustrated as encompassed by a rectangular non-conductive material that can flex, such as a polymer based material). The surface 706 and the surface 708 (e.g., the surface 706 and the surface 708 may be substantially parallel to each other) form a sensor capacitor 714 (e.g., the sensor capacitor 714 may be a variable capacitor formed because two conductive surface plates are separated and/or insulated from each other by an air dielectric between the surface 706 and the surface 708) in an area that overlaps the surface 706 and the surface 708. The surface 706 may be movable relative to the surface 708 in one embodiment. In addition, a reference capacitor 712 is formed between the surface 708 and the surface 710 (e.g., a reference surface). The surface 710 may be substantially parallel to the surface 706 and/or with the surface 708 in one embodiment. In addition, the surface 710 may be electrically coupled to the surface 706 and/or the surface 708. Since the surface 708 and the surface 710 may not alter positions with respect to each other when the force 700 is applied to the top layer 710, their capacitance may not change.

The spring assembly 504 of the area-sensing device 750 of FIG. 7 in different embodiments may include one or more metal conical washers. According to one embodiment, the spring assembly 504 of the area-sensing device 750 may include one conical washer, as illustrated in FIG. 1. According to another embodiment, the spring assembly 504 of the area-sensing device 750 may include a pair of conical washers, as illustrated in FIG. 2. According to another embodiment, the spring assembly 504 of the area-sensing device 750 may include multiple pairs of conical washers stacked on top of each other, as illustrated in FIG. 3. According to yet another embodiment, the spring assembly 504 of the area-sensing device 750 may include multiple sets of conical washers, each set including at least one conical washer, as illustrated in FIG. 4

Figure 8:
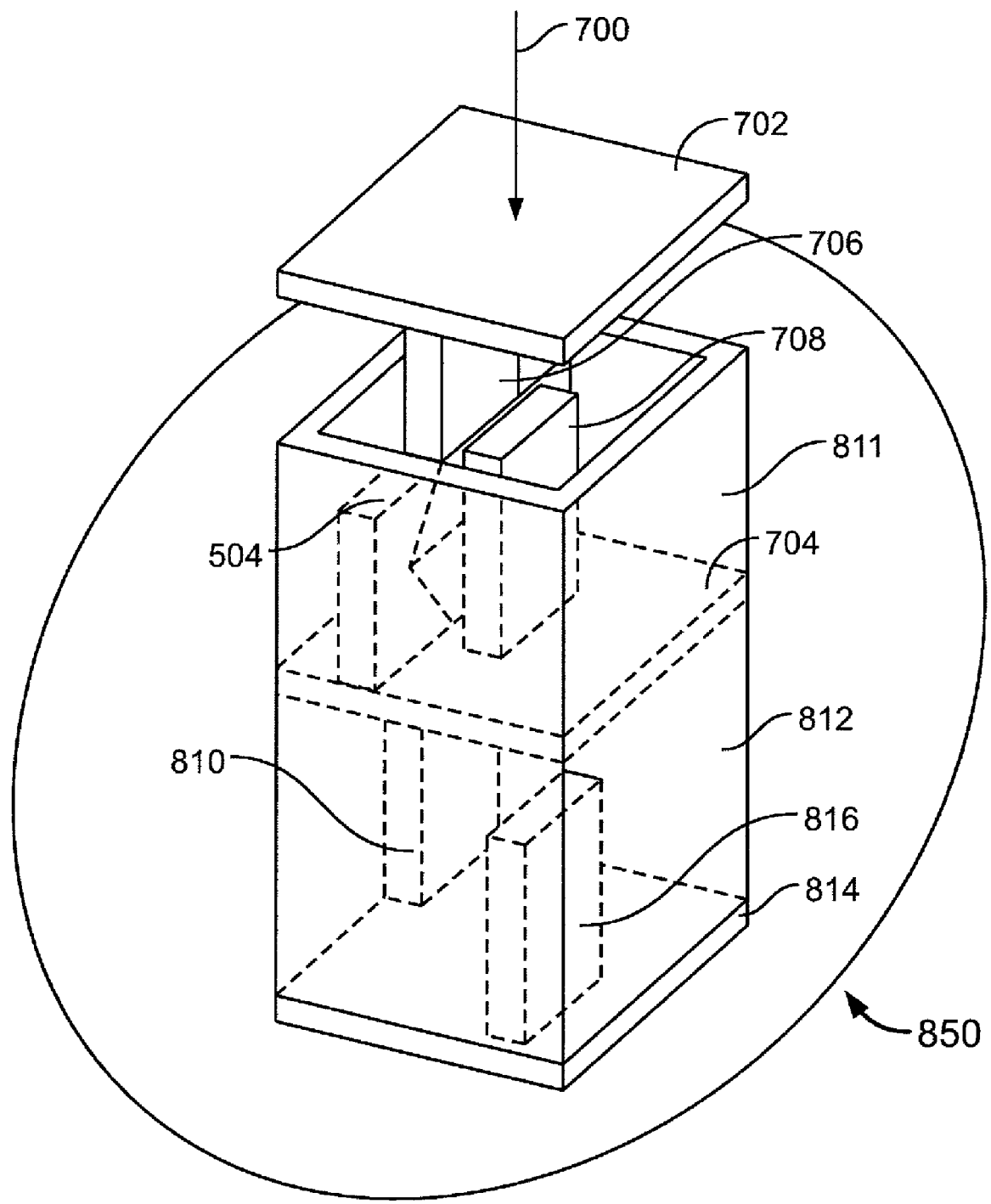
FIG. 8 is a multi-depth area-sensing device, according to one embodiment.

FIG. 8 is a multi-depth device 850 according to one embodiment. In FIG. 8, a top layer 702, a middle layer 704, and a bottom layer 814 are illustrated. The top layer 702 includes a plate 706 (e.g., a conductive surface). The plate 706 may be electrically separated from the top layer 702 by application of an insulating material between an area of affixation between the top layer 702 and the plate 706. A force 700 may be applied to the top layer 702 and the plate 706 to cause the plate 706 to deflect (e.g., move inward once a load and/or force 700 is applied to the top layer 702 as illustrated in FIG. 8). The movable surface 706 is substantially perpendicular to the fixed layer 704, but is not directly in contact with the fixed layer, the device 504 being positioned between the movable surface 702 and the fixed layer 704.

The middle layer 704 includes a plate 708 and the plate 810. In one embodiment, the middle layer 804 may include two separate layers bonded together each having either the plate 708 or the plate 810. The bottom layer 814 includes a plate 816. In one embodiment, there may be a shielding spacer (e.g., not shown, but the shielding spacer may be any type of spacer) between the reference capacitor (e.g., formed by the plate 810 and the plate 816) and a bottom of the housing (e.g., the bottom layer 814) to minimize an effect of a stray capacitance affecting the measurement (e.g., a height of the shielding spacer may be at least ten times larger than a plate spacer between plates of the reference capacitor and between plates of the sensor capacitor in one embodiment to minimize the stray capacitance). The plate 806 and the plate 808 may form a sensor capacitor (e.g., as formed by the fixed surface 170 and the movable surface 110 of FIG. 1). Similarly, the plate 810 and the plate 816 may form a reference capacitor (e.g., as formed by the plate 810 and the plate 816).

A spacer 811 may be used to physically separate the top layer 802 from the middle layer 804. In one embodiment, the spring assembly 504 (e.g., conical back to back springs) may be placed between (e.g., in the outer periphery between) the top plate 702 of FIG. 8 and the housing 811 of FIG. 8. A spacer 812 may be used to physically separate the middle layer 804 from the bottom layer 814. The multi-depth device 850 may be easier to manufacture according to one embodiment because of modularity of its design (e.g., various manufacturing techniques can be used to scale the multi-depth device 850 with a minimum number of sub-assemblies) in that various subassemblies may each include only one surface (e.g., the top layer 802, the middle layer 804, and the bottom layer 816 may include only one plate).

Figure 9:
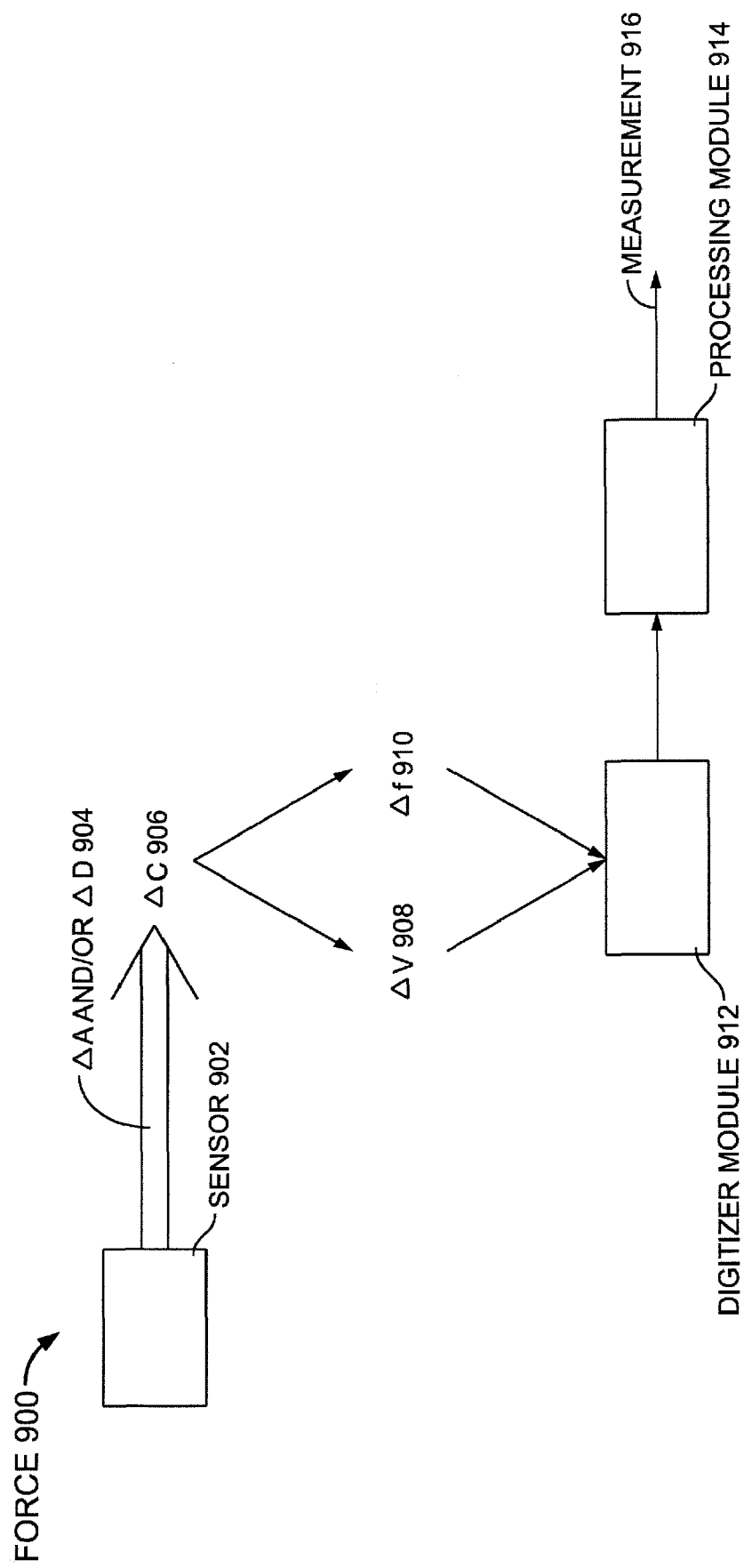
FIG. 9 is a process view to automatically generate a measurement based on a change in a gap and/or a change in an overlap area between a fixed surface and a movable surface, according to one embodiment.

FIG. 9 is a process view to automatically generate a measurement based on a change in a gap and/or a change in an overlap area between a fixed surface and a movable surface, according to one embodiment. FIG. 9 is a process view of measuring a force 900, according to one embodiment. In FIG. 9, a force 900 may be applied to a sensor 902 (e.g., the applied force 518 of FIG. 5, or the applied force 700 of FIG. 7), according to one embodiment. An electronic circuitry (e.g., a software and/or hardware code) may apply an algorithm to measure a change in a distance between the surface 616 and the surface 620 forming the sensor capacitor as illustrated in FIG. 6A and FIG. 6C (e.g., the sensor 902 may include the spring assembly 504 of FIG. 5 and/or any one or more of the devices 100, 200, 300, and 400 of FIGS. 1-4) when the force 518 of FIG. 5 is applied to a device (e.g., the stacked device 550). In an alternate embodiment, a change in area between the surfaces may be considered rather than a change in the gap (e.g., the change in an overlap area between the surface 706 and the surface 708 forming the sensor capacitor as illustrated in FIG. 7).

Next, a change in capacitance 906 may be calculated based on the change in the gap between the surfaces forming the sensor capacitor or change in the overlap area between the surfaces forming the sensor capacitor. The change in capacitance 906, a change in a voltage 908, and/or a change in a frequency 910 may also be calculated to generate a measurement (e.g., an estimation of the force 900 applied to the sensor 902). The change in capacitance 906 data, the change in voltage 908 data, and/or the change in frequency data 910 may be provided to a digitizer module 912 (e.g., an analog-to-digital converter). Finally, the digitizer module 912 may work with a processing module 914 (e.g., a microprocessor which may be integrated in the processing module 224) to convert the change in capacitance 906 data, the change in voltage 908 data, and/or the change in frequency data 910 to a measurement reading 916.

Figure 10:
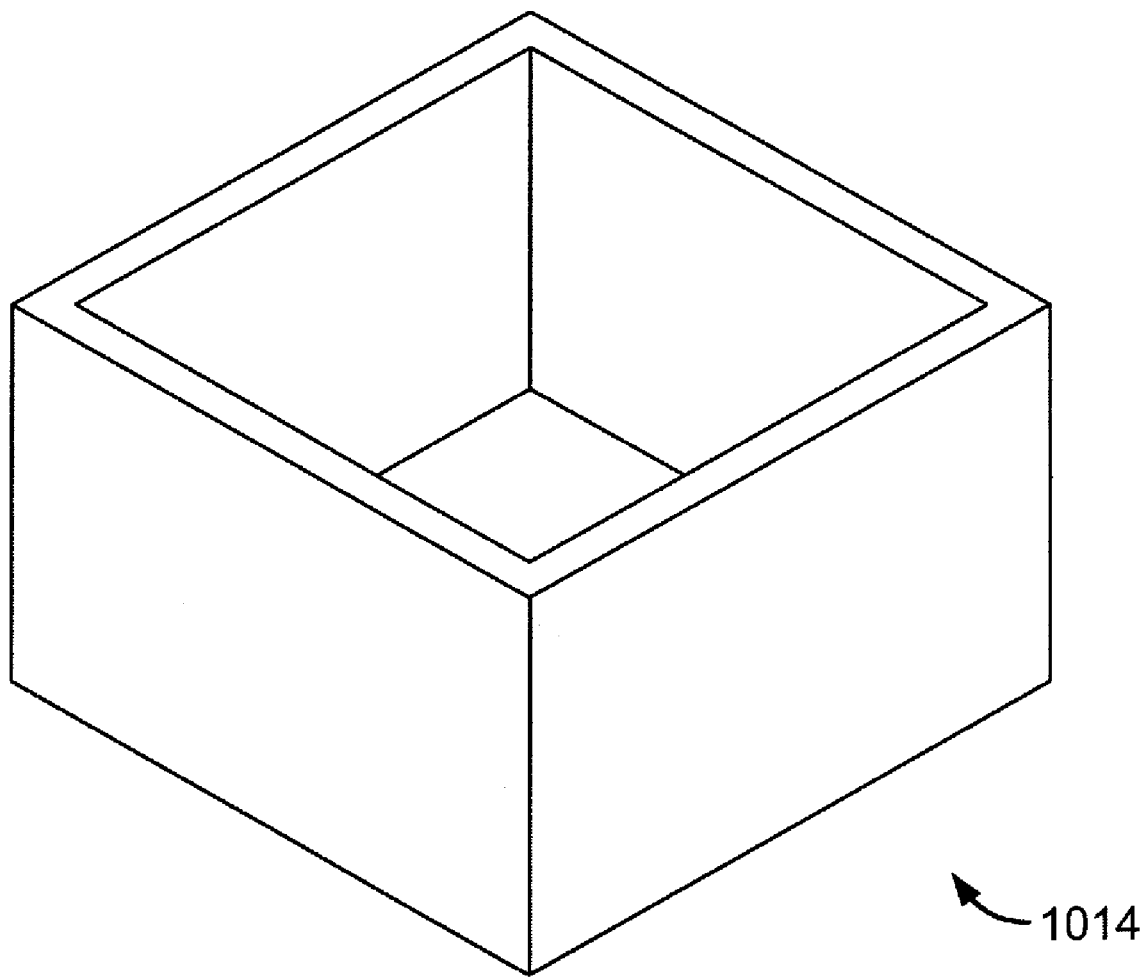
FIG. 10 is a three-dimensional view of a carved material that can be used to encompass the sensor capacitor and the reference capacitor in the boxed device, according to one embodiment.

FIG. 10 is a three-dimensional view of a carved material that can be used to encompass (e.g., provide a housing to) the sensor capacitor (e.g., the sensor capacitor 714 as illustrated in FIG. 7 and the reference capacitor (e.g., the reference capacitor 712 illustrated in FIG. 7) in a boxed device, according to one embodiment. In FIG. 10, single block (e.g., steel) is used to form a bottom cup 1014. In one embodiment, the bottom cup 1014 in FIG. 10 replaces the bottom layer of a boxed device, and encompasses the various structures (e.g., capacitive surfaces/plates, spacers, etc.) between a bottom layer and a top plate. The bottom cup 1014 may be formed from a single piece of metal through any process (e.g., involving cutting, milling, etching, and/or drilling, etc.) that maintains the structural and/or tensile integrity of the bottom cup 1014. This way, the bottom cup 1014 may be able to withstand larger amounts of force (e.g., the force 105 of FIG. 1) by channeling the force downward through the walls of the bottom cup 1014.

Figure 11:
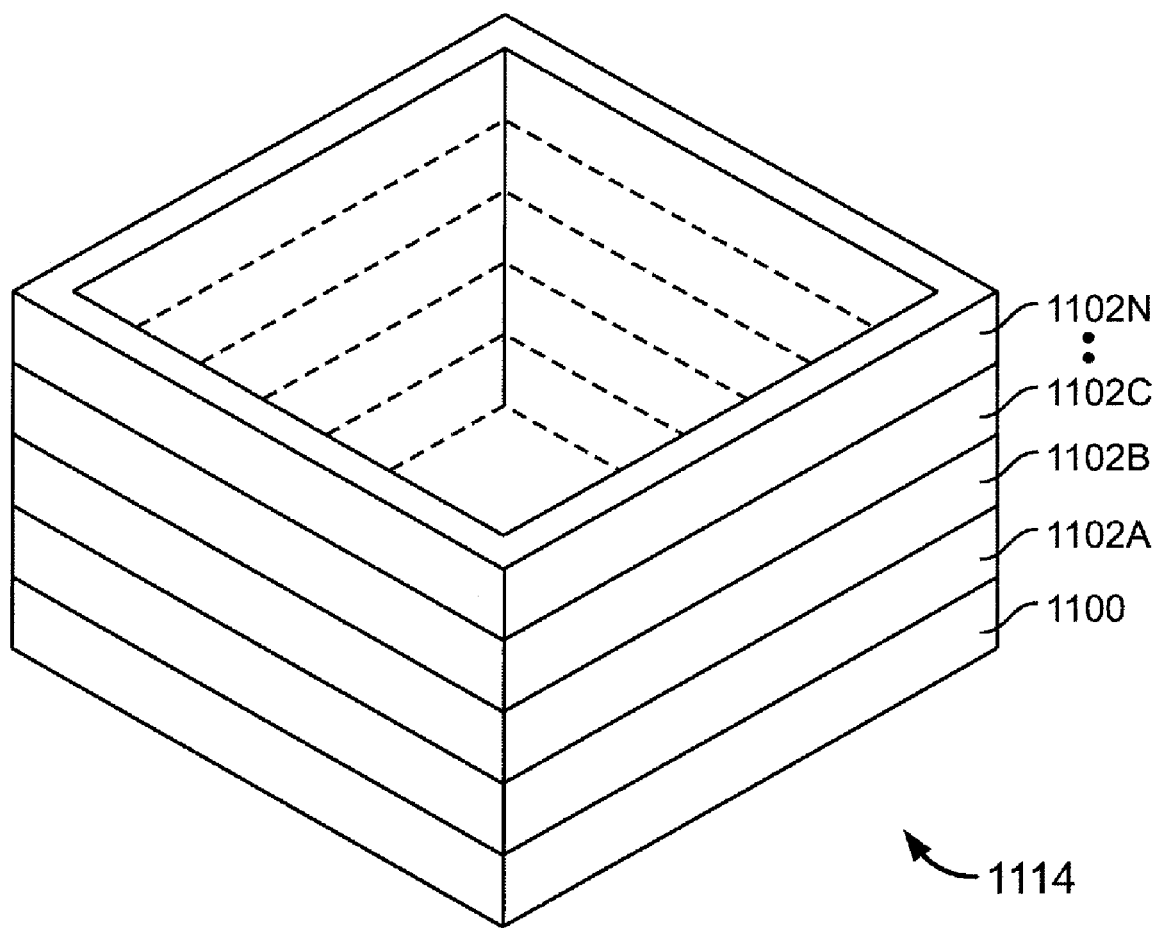
FIG. 11 is a three-dimensional view of multiple layers of a material that can be used to encompass the sensor capacitor and the reference capacitor in a boxed device, according to one embodiment.

FIG. 11 is a three-dimensional view of a multiple layers of a material that can be used to encompass the sensor capacitor and the reference capacitor in a boxed device, according to one embodiment. Particularly, FIG. 11 illustrates a bottom cup 1114 formed with multiple blocks of material according to one embodiment. A single thin solid metal block may form a bottom layer 1100 as illustrated in FIG. 11. In addition, other layers of the bottom cup 1114 may be formed from layers (e.g., the layers 1102A-1102N) each laser cut (e.g., laser etched) and/or patterned (e.g., to form the bottom cup 1114 at a cost lower than milling techniques in a single block as may be required in the bottom cup 1014 of FIG. 10). For example, the layers 1102A-1102N may be a standard metal size and/or shape, thereby reducing the cost of fabricating the bottom cup 1114.

In one embodiment, the bottom cup 1114 in FIG. 11 replaces the bottom layer of a boxed device, and encompasses the various structures (e.g., capacitive surfaces/plates, spacers, etc.) between a bottom layer and a top plate. Like in the embodiment of FIG. 10, the bottom cup 1114 of FIG. 11 may be able to withstand larger amounts of force (e.g., the force 105 of FIG. 1) by channeling the force downward through the walls of the bottom cup 1114. Furthermore, the bottom cup 1114 may be less expensive to manufacture than the bottom cup 1014 as described in FIG. 10 because standard machining techniques may be used to manufacture the bottom cup 1114.

Figure 12:
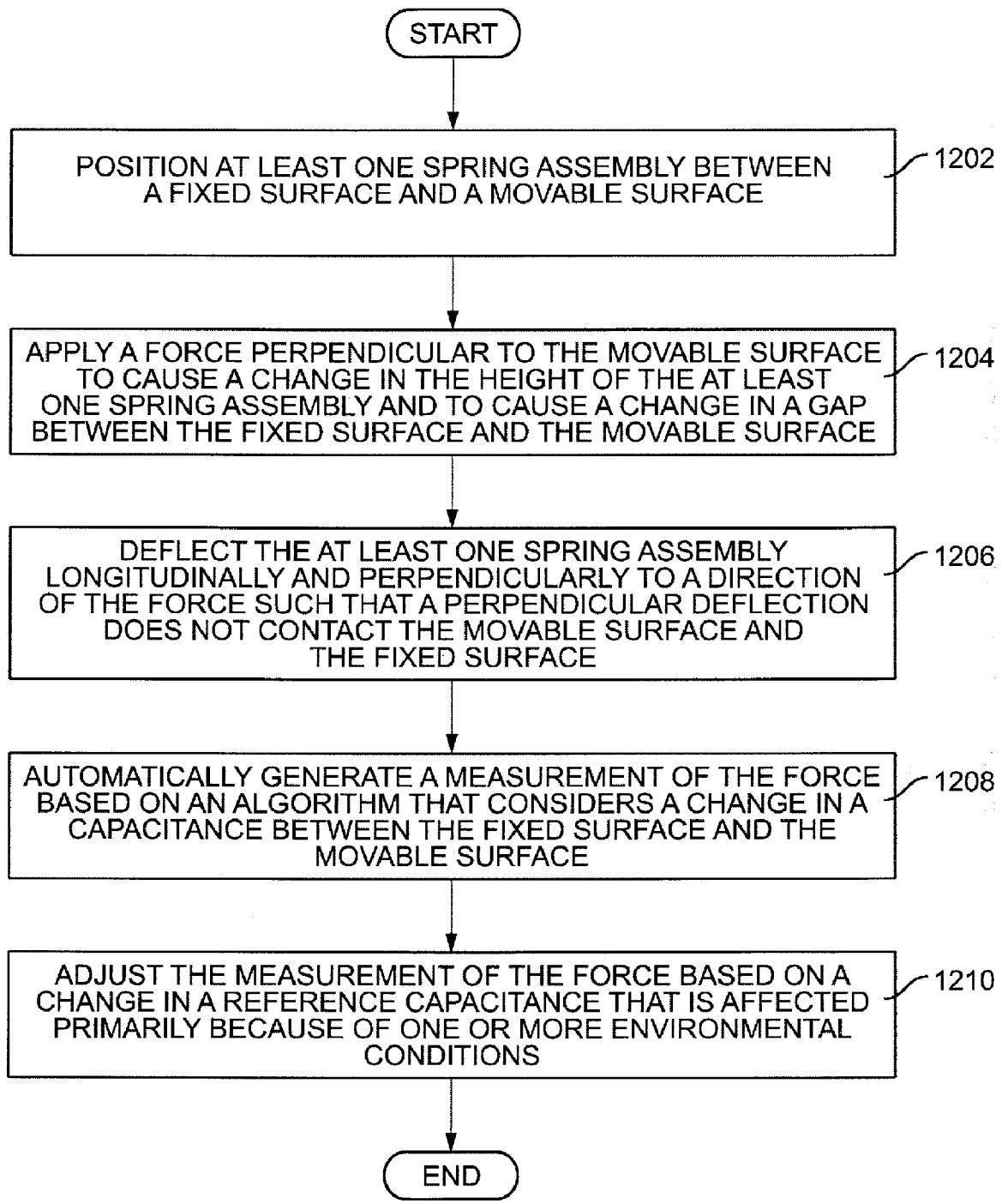
FIG. 12 is a process view to automatically generate a measurement of a force based on an algorithm that considers a change in a capacitance between a fixed surface and a movable surface, according to one embodiment.

FIG. 12 is a process view to automatically generate a measurement of a force based on an algorithm that considers a change in a capacitance between a fixed surface and a movable surface, according to one embodiment. At operation 1202, at least one spring assembly (e.g., the arrangements of conical washers as illustrated in FIGS. 1-4) is positioned between a fixed surface (e.g., the fixed surface 170 of FIG. 1) and a movable surface (e.g., the movable surface 110 of FIG. 1). At operation 1204, a force (e.g., due to the force 105 of FIG. 1) is applied perpendicular to the movable surface to cause a change in the height of the at least one spring assembly and to cause a change in a gap between the fixed surface and the movable surface.

At operation 1206, at least one spring assembly (e.g., the spring assembly as illustrated in FIG. 2) is deflected longitudinally and perpendicularly to a direction of the force such that a perpendicular deflection does not contact the movable surface and the fixed surface (e.g., the perpendicular deflection at the points of contact with the movable surface and the fixed surface may be negligible). At operation 1208, a measurement of a force may be automatically generated based on an algorithm that considers a change in a capacitance between the fixed surface and the movable surface. At operation 1210, the measurement of the force may be adjusted based on a change in a reference capacitance (e.g., formed by the surface 622 and the surface 628 of FIG. 6), that is affected primarily because of one or more environmental conditions (e.g., to compensate for changes in the measurement due to environmental conditions).

Figure 13:
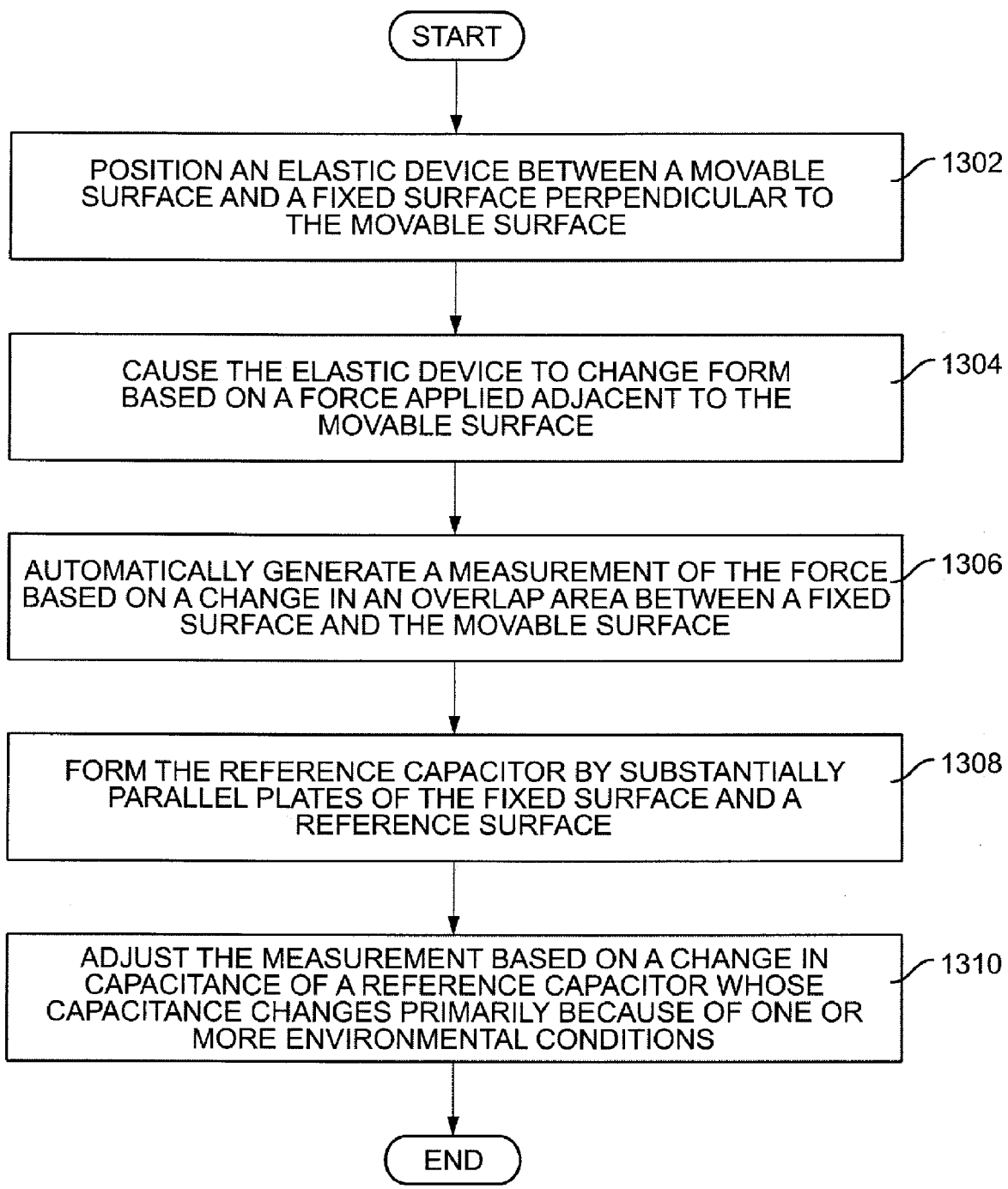
FIG. 13 is a process view to apply a load perpendicular to a movable surface to cause a change in a height of the at least one spring assembly and to cause a change in a gap between a fixed surface and the movable surface, according to one embodiment.

FIG. 13 is a process view to apply a force (due to the force 700 of FIG. 7) perpendicular to a movable surface (e.g., the movable surface 702 of FIG. 7) to cause a change in a height of the at least one spring assembly (e.g., the spring assembly as illustrated in FIG. 2) and to cause a change in a gap between a fixed surface and the movable surface, according to one embodiment. At operation 1302, an elastic device (e.g., the device 300 of FIG. 3) is positioned between a movable surface and a fixed surface perpendicular to the movable surface. At operation 1304, the elastic device is caused to change form (e.g., contract) based on a force applied adjacent to the movable surface. At operation 1306, a measurement of a force is automatically generated (e.g., by a software code and/or hardware) based on a change in an overlap area between a fixed surface and the movable surface. At operation 1308, a reference capacitor may be formed by substantially parallel plates of the fixed surface and a reference surface (e.g., as formed by the plate 810 and the plate 816 of FIG. 8). At operation 1310, a measurement is adjusted based on a change in capacitance of a reference capacitor whose capacitance changes because of one or more environmental conditions (e.g., temperature and/or humidity).

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:

1. A force measuring device comprising:
   a sensor capacitor having a fixed surface and a movable surface substantially parallel to the fixed surface;
   at least one spring assembly positioned between the fixed surface and the movable surface, wherein the at least one spring assembly comprises a conical washer having an inside edge of the conical washer that is wider than an outside edge of the conical washer; at least one spring assembly to alter in height in response to a force applied perpendicular to the movable surface and to cause a change in a gap between the fixed surface and the movable surface, wherein the conical washer is stacked with other conical washers to form the at least one spring assembly;
   a circuit to generate a measurement of the force based on an algorithm that considers a change in a capacitance of the sensor capacitor; and
   a reference capacitor to adjust the measurement based on at least one environmental condition.

2. The force measuring device of claim 1 wherein the fixed surface and the movable surface are painted on a plurality of non-conductive printed circuit boards.

3. A force measuring device, comprising:
   a sensor capacitor having a fixed surface and a movable surface substantially parallel to the fixed surface;
   a fixed layer perpendicular to the fixed surface;
   at least one spring assembly positioned between the movable surface and the fixed layer to alter in height in response to a force applied adjacent to the movable surface, and to cause a change in an overlap area between the fixed surface and the movable surface, wherein the at least one spring assembly to deflect longitudinally and perpendicularly to a direction of the force applied such that a perpendicular deflection does not contact the movable surface and the fixed surface, wherein the at least one spring assembly comprises a conical washer having an inside edge of the conical washer that is wider than an outside edge of the conical washer; and
   a circuit to determine a measurement based on an algorithm that considers a change in capacitance when the overlap area changes.

4. The force measuring device of claim 3 further comprising a reference capacitor integrated in the force measuring device to adjust based on one or more environmental conditions between the fixed surface and another fixed surface.

5. The force measuring device of claim 3 wherein the conical washer is stacked with other conical washers to form the at least one spring assembly, and wherein the fixed surface and the movable surface are painted on a plurality of nonconductive printed circuit boards.

6. A system to measure force, which comprises:
   means for positioning an elastic device between a movable surface and a fixed surface perpendicular to the movable surface, wherein the elastic device comprises a conical washer having an inside edge of the conical washer that is wider than an outside edge of the conical washer, and wherein the conical washer is stacked with other conical washers to form the elastic device;

means for causing the elastic device to change form based on a force applied adjacent to the movable surface;

means for automatically generating a measurement of the force based on a change in an overlap area between a fixed surface and the movable surface; and means for longitudinally and perpendicularly deflecting the elastic device in a direction of the force such that a perpendicular deflection does not contact the movable surface and the fixed surface.

7. The system of claim 6 further comprising means for forming the reference capacitor by substantially parallel plates of the fixed surface and a reference surface; and means for adjusting the measurement based on a change in capacitance of a reference capacitor whose capacitance changes primarily because of one or more environmental conditions.

8. A force measuring device, comprising:
a sensor capacitor having a fixed surface and a movable surface substantially parallel to the fixed surface;
a fixed layer perpendicular to the fixed surface;
at least one spring assembly positioned between the movable surface and the fixed layer to alter in height in response to a force applied adjacent to the movable surface, and to cause a change in an overlap area between the fixed surface and the movable surface, wherein the at least one spring assembly comprises a conical washer having an inside edge of the conical washer that is wider than an outside edge of the conical washer; and
a circuit to determine a measurement based on an algorithm that considers a change in capacitance when the overlap area changes.

9. A force measuring device, comprising:
a sensor capacitor having a fixed surface and a movable surface substantially parallel to the fixed surface;
a fixed layer perpendicular to the fixed surface;
at least one spring assembly positioned between the movable surface and the fixed layer to alter in height in response to a force applied adjacent to the movable surface, and to cause a change in an overlap area between the fixed surface and the movable surface, wherein the at least one spring assembly to deflect longitudinally and perpendicularly to a direction of the force such that a perpendicular deflection does not contact the movable surface and the fixed surface, wherein the at least one spring assembly comprises a conical washer having an inside edge of the conical washer that is wider than an outside edge of the conical washer, and wherein the conical washer is stacked with other conical washers to form the at least one spring assembly; and
a circuit to determine a measurement based on an algorithm that considers a change in capacitance when the overlap area changes.

10. A method to measure force, comprising:
positioning at least one spring assembly between a fixed surface and a movable surface;
applying a force perpendicular to the movable surface to cause a change in the height of the at least one spring assembly and to cause a change in a gap between the fixed surface and the movable surface, wherein the at least one spring assembly to deflect longitudinally and perpendicularly to a direction of the force applied such that a perpendicular deflection does not contact the movable surface and the fixed surface, wherein the at least one spring assembly comprises a conical washer having an inside edge of the conical washer that is wider than an outside edge of the conical washer; and
automatically generating a measurement of a force based on an algorithm that considers a change in a capacitance between the fixed surface and the movable surface.

11. A force measuring device, comprising:
a sensor capacitor having a fixed surface and a movable surface substantially parallel to the fixed surface;
a fixed layer perpendicular to the fixed surface;
at least one spring assembly positioned between the movable surface and the fixed layer to alter in height in response to a force applied adjacent to the movable surface, and to cause a change in an overlap area between the fixed surface and the movable surface, wherein the spring assembly comprises a conical washer having an inside edge of the conical washer that is wider than an outside edge of the conical washer, and wherein the conical washer is stacked with other conical washers to form the elastic device; and
a circuit to determine a measurement based on an algorithm that considers a change in capacitance when the overlap area changes.

12. The force measuring device of claim 11 further comprising a reference capacitor integrated in the force measuring device to adjust based on one or more environmental conditions between the fixed surface and another fixed surface.

13. The force measuring device of claim 11 wherein the conical washer is stacked with other conical washers to form the at least one spring assembly, and wherein the fixed surface and the movable surface are painted on a plurality of nonconductive printed circuit boards.

* * * * *